United States Patent [19]

Wise et al.

[11] Patent Number: 4,489,112
[45] Date of Patent: Dec. 18, 1984

[54] LAMINATED PAPERBOARD CONTAINER WITH ABSORPTION RESISTANCE MEANS, AND BLANK FOR CONSTRUCTING SAME

[75] Inventors: Daniel J. Wise, Farmington; Donna M. Woodhall, Livonia, both of Mich.

[73] Assignee: Ex-Cell-O Corporation, Troy, Mich.

[21] Appl. No.: 479,603

[22] Filed: Mar. 28, 1983

[51] Int. Cl.³ .................... B65D 15/22; B32B 21/06; B32B 15/08

[52] U.S. Cl. .................... 428/35; 229/3.1; 426/126; 426/127; 428/219; 428/461; 428/512; 428/516

[58] Field of Search .................... 229/17 R, 17 G, 3.1; 426/126, 127; 428/219, 215, 216, 512, 35, 516, 461

[56] References Cited

U.S. PATENT DOCUMENTS

| | | | |
|---|---|---|---|
| 3,120,335 | 2/1964 | Egleston et al. | 229/17 G |
| 3,270,940 | 9/1966 | Egleston et al. | 229/17 G |
| 3,707,393 | 12/1972 | McDonald | 428/512 |
| 3,972,467 | 8/1976 | Whillock et al. | 428/215 |
| 4,239,150 | 12/1980 | Schadowski et al. | 229/48 R |
| 4,254,693 | 3/1981 | Schadowski et al. | 493/228 |
| 4,300,969 | 11/1981 | Frydendal | 428/219 |
| 4,341,340 | 7/1982 | Lisiecki | 229/17 R |
| 4,389,438 | 6/1983 | Ohtsuki et al. | 426/126 |

*Primary Examiner*—John E. Kittle
*Attorney, Agent, or Firm*—John P. Moran

[57] ABSTRACT

The drawings and description disclose a heat sealable container for edible oils and other types of oils, and a blank for constructing same, having a laminated wall construction of suitable oil resistant barriers or layers which are compatible with one another insofar as bonding and sealing are concerned. Such wall construction includes central layers of aluminum foil and fluorochemically treated paperboard secured to one another by a suitable adhesive, an ionomer layer, such as Surlyn, formed on each outer paperboard and foil surface, and a layer of thermoplastic material, such as polyethylene, formed on each outer Surlyn surface.

19 Claims, 4 Drawing Figures

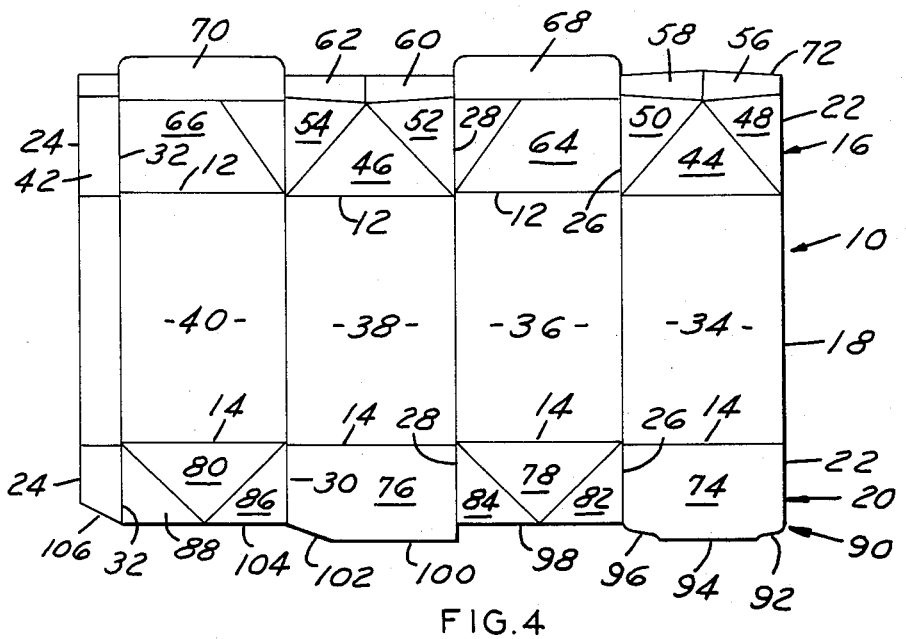
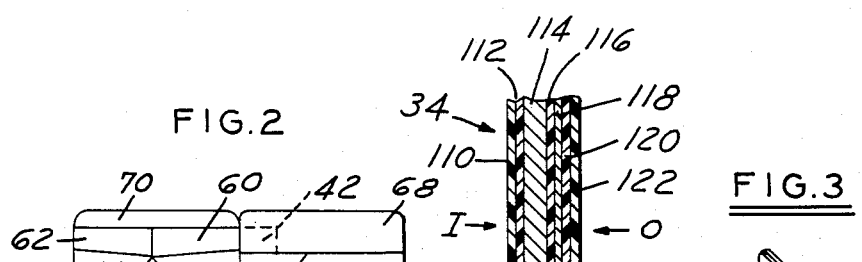
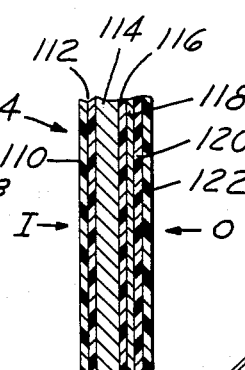
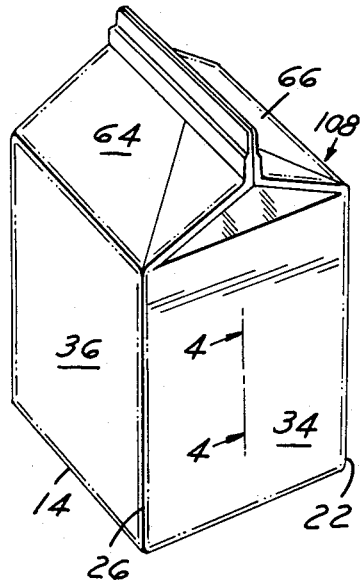

LAMINATED PAPERBOARD CONTAINER WITH ABSORPTION RESISTANCE MEANS, AND BLANK FOR CONSTRUCTING SAME

TECHNICAL FIELD

This invention relates generally to paperboard containers and, more particularly to a wall construction for same to provide an oil, grease, and solvent resistant package.

BACKGROUND ART

Various industries have found that central packaging for distant markets is a beneficial approach in their business activity and can assist them in developing strong market bases. With the increased emphasis on volume producing and marketing, many centers of population in reference to a product market base even extend across international boundaries. Thus, out of both necessity and convenience, situations have developed where essential production marketing areas extend over vast market areas. The longer shelf life is needed so that producers and suppliers can provide uniform top quality merchandise throughout their areas of distribution.

It is also well known to include a layer of aluminum foil, which generally serves as a means of preventing oxygen and ultra violet light rays from penetrating through the walls of a paperboard container. However, when the product being packaged is an edible oil or other oil product, additional precautions may be taken to assure a total resistance to penetration or staining through the wall of the paperboard container to the outside surface over a long shelf life.

DISCLOSURE OF THE INVENTION

Accordingly, a general object of the invention is to provide an improved, economical paperboard container which is capable of improving the shelf life of oils.

Another object of the invention is to provide a container having an improved wall construction of suitable oil and grease resistant barriers or layers which are compatible with one another insofar as bonding and sealing are concerned.

A further object of the invention is to provide a paperboard container for retaining edible oils and other type oils, wherein the wall construction includes a suitable combination of layers of thermoplastic material, such as polyethylene, ionomers, such as Surlyns, and aluminum foil, in conjunction with bleached or unbleached, and suitably treated paperboard material, so as to bond to one another, seal properly after filling, and be resistant to staining on the outside thereof over an extended shelf life.

These and other objects and advantages of the invention will be apparent when reference is made to the following description and accompanying drawings, wherein:

BRIEF DESCRIPTION OF DRAWINGS

FIG. 1 is a layout view of the inside surface of a container blank body, to which the present invention could be adapted;

FIG. 2 is a flat side seamed blank made from the container blank shown in FIG. 1, and showing the outside surface thereof;

FIG. 3 is a perspective view of a container fabricated from the blanks shown in FIGS. 1 and 2; and FIG. 4 is a fragmentary cross-sectional view through a side panel taken on the line 4—4 of FIG. 3, and looking in the direction of the arrows.

BEST MODE OF CARRYING OUT THE INVENTION

Referring now to the drawings in greater detail, FIG. 1 illustrates the inside surface of a container blank 10. The container blank 10 is separated into three general groups by staggered score lines 12 and 14. The group above staggered score line 12 is referred to as top closure group 16. The group between staggered score lines 12 and 14 are referred to as body group 18. The group below staggered score line 14 is referred to as bottom closure group 20. The container blank 10 is defined on its sides by side edges 22 and 24 and is separated vertically by a series of score lines 26, 28, 30 and 32. The score lines 26, 28, 30 and 32 divide the group body 18 into side wall panels 34, 36, 38 and 40 and side seam flap 42.

The top closure group 16 is mounted on the upper end of body group 18. Triangular end panels 44 and 46 are mounted to upper ends of the side wall panels 34 and 38, respectively. The triangular end panel 44 has a pair of adjacent fold-back panels 48 and 50 mounted on its upper sides and the triangular end panel 46 has a pair of fold-back end panels 52 and 54 mounted on its upper sides. A pair of inner rib panels 56 and 58 are mounted adjacent the fold-back panels 48 and 50, respectively. A pair of inner rib panels 60 and 62 are mounted adjacent the fold-back panels 52 and 54, respectively.

A pair of roof panels 64 and 66 are mounted to the body group 18 at the upper end of the wide wall panels 36 and 40, respectively. A pair of outer sealing rib panels 68 and 70 are mounted at the upper end of the roof panels 64 and 66, respectively. A top edge member 72 defines the upper free end of top closure group 16. A complete description of the top closure group 16 is not necessary to understand the principles of the present invention. However, reference is made to U.S. Pat. No. 3,270,940 which issued Sept. 6, 1966 for a complete description of a top closure group similar to top closure group 16.

The bottom closure group 20 is mounted on the lower end of body group 18. A tuck-in flap 74 and a tuck-out flap 76 are mounted at the lower ends of the side wall panels 34 and 38, respectively, along the staggered score line 14.

A first minor flap 78 and second minor flap 80 are mounted at the bottom of the side wall panels 36 and 40, respectively, along the staggered score line 14. A pair of fold-back panels 82 and 84 connect the first minor flap 78 to the tuck-in flap 74 and the tuck-out flap 76, respectively. The second minor flap 80 is connected to the tuck-out flap 76 and the side seam flap 42 by fold-back panels 86 and 88, respectively.

A bottom edge member 90 defines the free end of the bottom closure group 20. The bottom edge member 90 is substantially defined by three sections at the bottom edge of the tuck-in flap 74. These three sections or portions are defined by a cam edge 92, a straight edge 94 and a cam edge 96. The bottom edge member 90 is defined as an edge portion 98 along the free edge of fold-back panels 82 and 84. The tuck-out panel 76 has its bottom edge member 90 defined by a free edge portion which is substantially an extension of the score line 28, a straight edge 100 and a diagonal edge 102. The free edge portion of the fold-back panels 86 and 88 is defined by an edge portion 104. The side seam flap 42 has its portion of the bottom edge member 90 defined by a diagonal edge 106.

When the container blank 10 is being prepared for assembly as a container it will be side seamed by having the roof panel 66, the side wall panel 40 and the second minor flap 80 and its associated fold-back panels 86 and 88 along with the side seam flap 42 folded about the score line 30 moving their inside surfaces into contact with the inside surfaces of the triangular end panel 46, the side wall panel 38 and the tuck-out flap 76 and the side seam flap 42's inside surface extending past the score line 28.

The triangular end panel 44, the side wall panel 34 and the tuck-in flap 74 will be rotated about the score line 26 so their inside surfaces will move toward the inside surface of the roof panel 64, the side wall panel 36 and the first minor flap 78 and the fold-back panels 82 and 84. The side edge 22 will then be substantially aligned with the score line 32 and its associated edge portion will be aligned with and in contact with the outside surface of the side seam flap 42. The outside surface of side seam flap 42 is secured to the inside surface of the various panel and flap members being positioned along the side edge 22. This can be accomplished in many ways. One of the preferred methods is heat sealing which will establish a surface bond between the above stated members. The container blank 10 can then be opened into tubular form as illustrated in FIG. 3 as a tubular container member 108.

In normal production operations the bottom closure group 20 will be closed and sealed, the contents will be passed into the tubular container member 108 and then the top closure group 16 will be closed, as illustrated in FIG. 3.

The forming of the side seam blank and the closing of the top closure group is covered in detail in the above mentioned U.S. Pat. No. 3,270,940. The diagonal edge 106 and the diagonal edge 102 are provided so that when the container is constructed there will not be an extra layer of paper as the tuck-out flap 76 will not extend over the side seam flap 42 when the bottom closure group 20 is in constructed form. This is covered in detail in U.S. Pat. Nos. 3,120,335 and 4,341,340.

Referring now to FIG. 4, wherein a cross-sectional view of the wall of the container wall is represented, an arrow I identifies the inside surface of the container 108, and an arrow O identifies the outside surface of the container 108. The identification of the progressive layers from the inside to the outside is as follows. A uniform layer 110 is the inside coating, which consists of a suitable thermoplastic material, such as a low density polyethylene. A layer 112 consists of a selected sodium ionomer type Surlyn. Such Surlyn is selected for its oil resistant quality. The next layer 114 is the paperboard material which is the main material of the container 108 body. A layer 116 consists of a suitable adhesive means, such as a zinc ionomer type Surlyn, and serves to bind a layer 118 of aluminum foil to the outside surface of the paperboard layer 114. The aluminum foil layer 118 serves not only as an attractive outer appearance, but also as a barrier means to prevent the transfer therethrough of any stains from oils, greases and solvents. This layer may, if desired, consist of a metalized polyester, in lieu of aluminum foil. Next is another adhesive layer 120 which may be a zinc ionomer type Surlyn. Finally, a layer 122 of low density polyethylene, like the inside layer 110, forms a uniform outside coating or barrier.

FIG. 4 is not drawn to scale, and the following are examples of ranges of suitable weights per square meter of the material of the respective layers which could be used in a practical embodiment of a container in accordance to the invention: layer 110=20 to 35 grams (0.00085"-0.00142"), layer 112=30 to 40 grams (0.00125"-0.00167"), layer 114=250 to 550 grams (0.0123"-0.0254"), layer 116=10 to 15 grams (0.00042"-0.00063"), layer 118=16 to 25 grams (0.00024"-0.00037"), layer 120=12 to 17 grams (0.00050"-0.00075"), and layer 122=12 to 17 grams (0.00050"-0.00075"). A specific combination which has been found to be satisfactory for a quart or liter size container consists of an inside polyethylene layer 110 of 25 grams per square meter, a sodium ionomer type Surlyn layer 112 of 40 grams per square meter, a paperboard layer 114 of 320 grams per square meter, an intermediate zinc ionomer type Surlyn layer 116 of 15 grams per square meter, an aluminum foil layer 118 of 25 grams per square meter, another zinc ionomer type Surlyn layer 120 of 15 grams per square meter, and an outside polyethylene layer 122 of 15 grams per square meter, for a total weight of 455 grams per square meter. For a half pint or 250 milli-liter size container, the layer 110 is preferably 20 grams per square meter, and the layer 114 is 250 grams per square meter; for a pint or 500 milli-liter size, 20 for layer 110 and 275 for layer 114; for a one half gallon or 2 liter size, 30 for layer 110 and 475 for layer 114; and for a gallon or 4 liter size, 35 for layer 110 and 540 for layer 114.

For some oil product applications it may be sufficient to omit the aluminum foil layer 118 and the adjacent adhesive layers 116 and 120 without encountering staining on the outside surface.

While the sodium ionomer Surlyn and aluminum foil layers serve to resist penetration and staining by the confined oil, additionally, the paperboard itself is treated as described below to assure a high commercial quality oil container.

For containers of the type described above, the paperboard consists of paperboard made from virgin pulps, with such board being either bleached sulphate, or natural, i.e., unbleached, sulphate, the term sulphate also being known as "kraft". When used to contain edible oils or other oil products, such paperboard may be treated with fluorochemical paper sizing, such as "Zonyl RP", a commercially available product of E. I. du Pont de Nemours and Company, or "Scotchban", a commercially available product of Commercial Chemicals Division of 3M Company, in order to have resistance not only at its inner cut edges but at all cracks or pinholes to penetration by such oil products. Along with treatment in this manner, it may be beneficial for the inner cut edges to be "skived" or folded over in some one of several known manners, such as that shown and described in U.S. Pat. No. 4,254,693, resulting in a carton edge structure, as shown in U.S. Pat. No. 4,239,150.

INDUSTRIAL APPLICABILITY

It should be apparent that the invention provides an improved oil, grease, and solvent resistant package.

It should also be apparent that the respective layers of materials described above may be varied in thickness independently of the other layers to suit particular liquid packaging applications.

While but one specific embodiment of the invention has been described, other modifications thereof are possible.

The embodiments of the invention in which an exclusive property or privilege is claimed are defined as follows:

1. A one-piece foldable, laminated blank for forming a sealed liquid container, said blank comprising:
   (a) a layer of fluorochemically treated kraft paperboard material having a predetermined weight per given area;
   (b) a first layer of ionomer resin having a predetermined weight per given area and forming a uniform coating on one surface of said layer of kraft paperboard material;
   (c) a layer of adhesive having a predetermined weight per given area and formed uniformly on the other surface of said layer of kraft paperboard material;
   (d) a layer of a metalized material having a predetermined weight per given area and secured by said adhesive to said layer of kraft paperboard material;
   (e) a second layer of ionomer resin having a predetermined weight per given area and forming a uniform coating on said layer of metallized material; and
   (f) first and second layers of thermoplastic material having a predetermined weight per given area and forming uniform inner and outer coatings on said first and second layers of ionomer resin, respectively.

2. The laminated blank described in claim 1, wherein said layer of kraft paperboard material weighs between 250 and 550 grams per square meter.

3. The laminated blank described in claim 1, wherein said first layer of ionomer resin weighs between 30 and 40 grams per square meter.

4. The laminated blank described in claim 3, wherein said first layer of ionomer resin is a sodium ionomer type resin.

5. The laminated blank described in claim 1, wherein said layer of adhesive weighs between 10 and 15 grams per square meter.

6. The laminated blank described in claim 5, wherein said layer of adhesive consists of an ionomer resin material.

7. The laminated blank described in claim 6, wherein said ionomer resin material is a zinc ionomer type resin.

8. The laminated blank described in claim 1, wherein said layer of metalized material weighs between 16 and 25 grams per square meter.

9. The laminated blank described in claim 8, wherein said layer of metalized material consists of aluminum foil.

10. The laminated blank described in claim 8, wherein said layer of metalized material consists of a metalized polyester.

11. The laminated blank described in claim 1, wherein said second layer of ionomer resin weighs between 12 and 17 grams per square meter.

12. The laminated blank described in claim 11, wherein said second layer of ionomer resin is a sodium ionomer type resin.

13. The laminated blank described in claim 1, wherein said first layer of thermoplastic material weighs between 20 and 35 grams per square meter.

14. The laminated blank described in claim 1, wherein said second layer of thermoplastic material weighs between 12 and 17 grams per square meter.

15. The laminated blank described in claim 1, wherein each of said first and second layers of thermoplastic material consists of polyethylene.

16. A one-piece foldable, laminated blank for forming a sealed liquid container, said blank comprising:
    (a) a layer of fluorochemically treated kraft paperboard material weighing on the order of 320 grams per square meter;
    (b) a first layer of ionomer resin weighing on the order of 40 grams per square meter and forming a uniform coating on one surface of said layer of kraft paperboard material;
    (c) a second layer of ionomer resin weighing on the order of 15 grams per square meter and formed uniformly on the other surface of said layer of kraft paperboard material;
    (d) a layer of aluminum foil weighing on the order of 25 grams per square meter and secured by said second layer of ionomer resin to said layer of kraft paperboard material; and
    (e) a third layer of ionomer resin weighing on the order of 15 grams per square meter and forming a uniform coating on said layer of aluminum foil; and
    (f) first and second layers of thermoplastic material weighing 25 and 15 grams per square meter, respectively, and forming uniform inner and outer coatings on said first and third layers of ionomer resin, respectively.

17. An oil, grease, and solvent resistant, heat-sealed container formed from a one-piece foldable laminated blank of sheet material, said container comprising four side wall panels forming a tubular body of rectangular cross section having a fold-in top closure and a fold-in bottom closure; said sheet material comprising first and second thicknesses of heat-sealable ionomer resin thermally bonded to opposite sides of a third thickness of paperboard, a fourth thickness of aluminum foil bonded between said second thickness of heat-sealable ionomer resin and a fifth thickness of heat-sealable ionomer resin, and sixth and seventh thicknesses of heat-sealable polyethylene thermally bonded as the respective inner and outer surfaces on the first and fifth thicknesses of heat-sealable ionomer resin, to form a liquid-proof semi-rigid container.

18. An oil, grease, and solvent resistant, heat-sealed container formed from a one-piece foldable laminated blank of paperboard said container comprising:
    (a) four side wall panels forming a tubular body of rectangular cross section having fold-in top and bottom closures;
    (b) said container being formed from fluorochemically treated paperboard weighing on the order of 320 grams per square meter and thermally bonded between an inner layer of ionomer resin and an outer layer of adhesive weighing, respectively, on the order of 40 and 15 grams per square meter;
    (c) a layer of aluminum foil weighing on the order of 25 grams per square meter secured to said adhesive;
    (d) A layer of ionomer resin formed on the layer of aluminum foil, weighing on the order of 15 grams per square meter, and
    (e) a layer of polyethylene formed on each of the ionomer resin layers, weighing on the order of 15 grams per square meter adjacent the 15 gram per square meter ionomer resin layer, and 25 grams per square meter adjacent the 40 gram per square meter ionomer resin layer.

19. An oil, grease, and solvent resistant, heat-sealed container formed from a one-piece foldable laminated blank of paperboard said container comprising:
(a) four side wall panels forming a tubular body of rectangular cross section having fold-in top and bottom closures;
(b) said container being formed from fluorochemically treated paperboard weighing on the order of 320 grams per square meter and thermally bonded between an inner layer of ionomer resin and an outer layer of adhesive weighing, respectively, on the order of 40 and 15 grams per square meter;
(c) a layer of metallized polyester weighing on the order of 18 grams per square meter secured to said adhesive;
(d) A layer of ionomer resin formed on the layer of metallized polyester, weighing on the order of 15 grams per square meter, and
(e) a layer of polyethylene formed on each of the ionomer resin layers, weighing on the order of 15 grams per square meter adjacent the 15 gram per square meter ionomer resin layer, and 25 grams per square meter adjacent the 40 gram per square meter ionomer resin layer.

* * * * *